United States Patent
Russ

(10) Patent No.: US 8,602,736 B2
(45) Date of Patent: Dec. 10, 2013

(54) STOW ABORT MECHANISM FOR A RAM AIR TURBINE

(75) Inventor: David Everett Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 929 days.

(21) Appl. No.: 12/728,403

(22) Filed: Mar. 22, 2010

(65) Prior Publication Data

US 2011/0229342 A1    Sep. 22, 2011

(51) Int. Cl.
*B64C 27/50* (2006.01)

(52) U.S. Cl.
USPC .............. 416/143; 416/147; 416/246

(58) Field of Classification Search
USPC ............ 416/142, 143, 147, 148, 246
See application file for complete search history.

(56) References Cited

U.S. PATENT DOCUMENTS

| | | |
|---|---|---|
| 4,676,458 A | 6/1987 | Cohen |
| 4,717,095 A | 1/1988 | Cohen et al. |
| 4,742,976 A | 5/1988 | Cohen |
| 4,743,163 A | 5/1988 | Markunas et al. |
| 5,123,614 A | 6/1992 | Whitehouse |
| 5,820,074 A | 10/1998 | Trommer et al. |
| 6,581,874 B2 | 6/2003 | Lemire et al. |
| 7,063,290 B2 | 6/2006 | Marche |
| 7,416,392 B2 * | 8/2008 | Russ .......................... 416/142 |
| 2006/0260323 A1 | 11/2006 | Moulebhar |
| 2007/0237640 A1 | 10/2007 | Russ |

FOREIGN PATENT DOCUMENTS

| | | |
|---|---|---|
| CN | 101312877 | 11/2008 |
| CN | 101596936 | 12/2009 |
| GB | 2479039 | 9/2011 |
| WO | 87/02642 | 5/1987 |

OTHER PUBLICATIONS

United Kingdom Combined Search and Examination Report for Application No. GB1103869.2 dated Jun. 27, 2011.
United Kingdom Combined Search and Examination Report for GB1110478.3 dated Oct. 11, 2011.

\* cited by examiner

*Primary Examiner* — Nathaniel Wiehe
*Assistant Examiner* — Adam W Brown
(74) *Attorney, Agent, or Firm* — Carlson, Gaskey & Olds, P.C.

(57) ABSTRACT

A disclosed ram air turbine assembly includes a movable support structure that is prevented from moving to a stowed position by a stow abort mechanism that prevents movement to the stowed position when the turbine is not in a desired orientation.

21 Claims, 4 Drawing Sheets

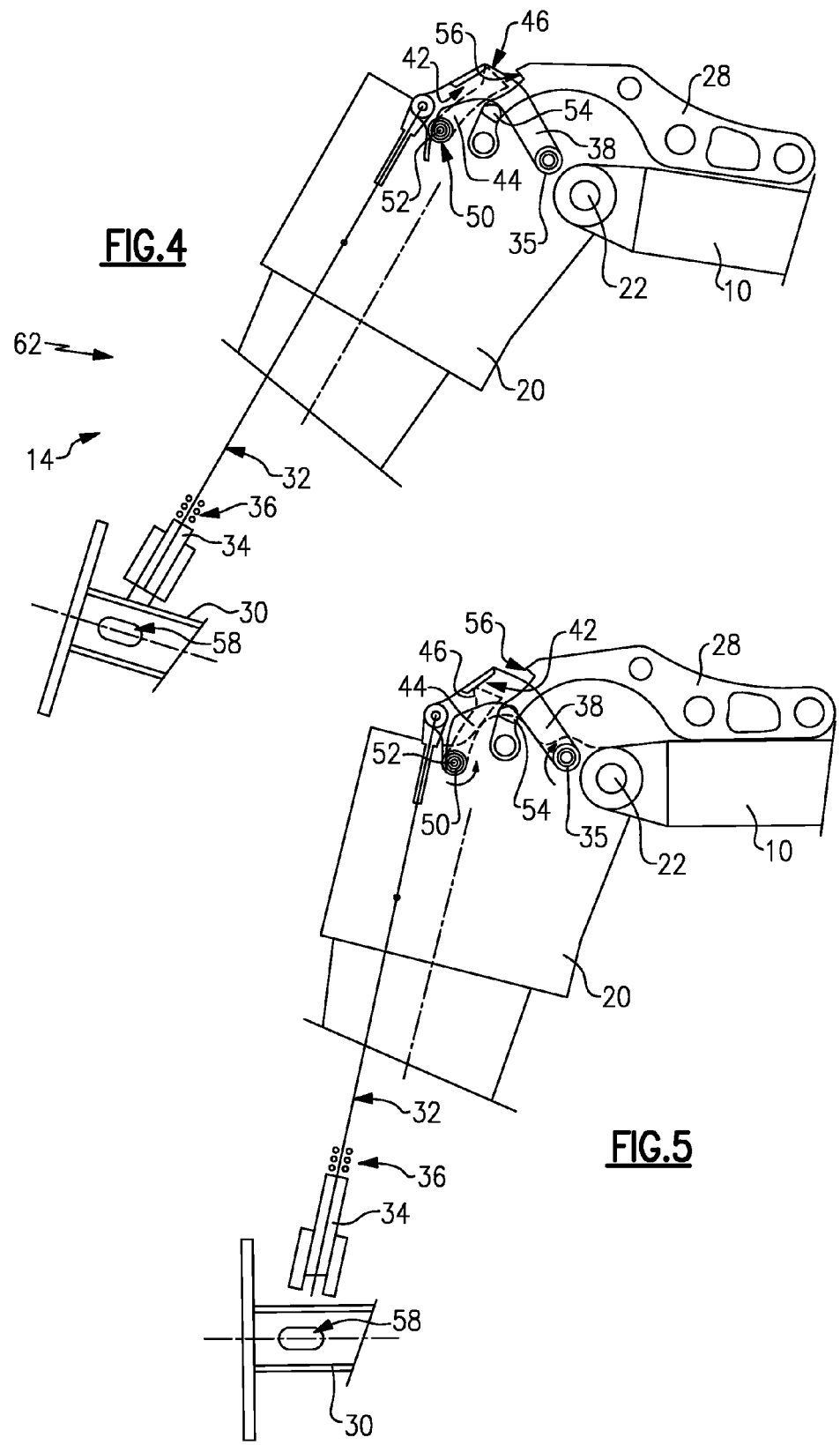

STOW ABORT MECHANISM FOR A RAM AIR TURBINE

BACKGROUND

This disclosure generally relates to a deployment mechanism for a ram air turbine. More particularly, this disclosure relates to a deployment mechanism that includes features that prevent storage of the ram air turbine when the turbine is not in a desired orientation.

A ram air turbine is used to generate supplemental power in an aircraft by extracting power from an air stream proximate the exterior of the aircraft during flight. The ram air turbine includes a turbine that drives an electric motor or hydraulic pump that is suspended on a strut assembly. In operation, the turbine is moved outward from the airplane to a position that provides clearance between blades of the turbine and the aircraft. A release mechanism prevents rotation of the blades until the turbine is sufficiently clear of the aircraft. Storage of the ram air turbine after use requires that the blades be again locked in a position that does not allow contact with the exterior surface or door of the aircraft. Confirmation that the blades are locked and in a stowable orientation is conventionally indicated by electronic sensors that sense a position of a release mechanism. The use of electronic sensors increases programming burdens and requires time consuming calibration and maintenance.

SUMMARY

A disclosed ram air turbine assembly includes a movable turbine support structure that is prevented from moving to a stowed position by a mechanism that prevents stowing when the turbine is not in a desired orientation.

The disclosed example ram air turbine includes turbine blades that drive a turbine. The turbine blades need to be in a specific orientation to be properly stowed. The disclosed ram air turbine includes a pawl that is driven by a cam on a release lever. The release lever is movable in response to a release pin being either in an engaged position to prevent drive shaft rotation and maintain a desired orientation of a turbine blade or a disengaged position that allows rotation of the drive shaft. When the release pin is in the disengaged position the pawl is moved to a position that prevents movement to the stowed position.

Accordingly, the disclosed stow abort and prevention system prevents movement of the ram air turbine to the stowed position when not in a proper orientation.

These and other features disclosed herein can be best understood from the following specification and drawings, the following of which is a brief description.

BRIEF DESCRIPTION OF THE DRAWINGS

FIG. 4 is a schematic representation of the example ram air turbine in a partially deployed position near full deployment.

FIG. 5 is a schematic illustration of the example ram air turbine in a fully deployed position with a release pin moved to a released position.

DETAILED DESCRIPTION

Figure 1:
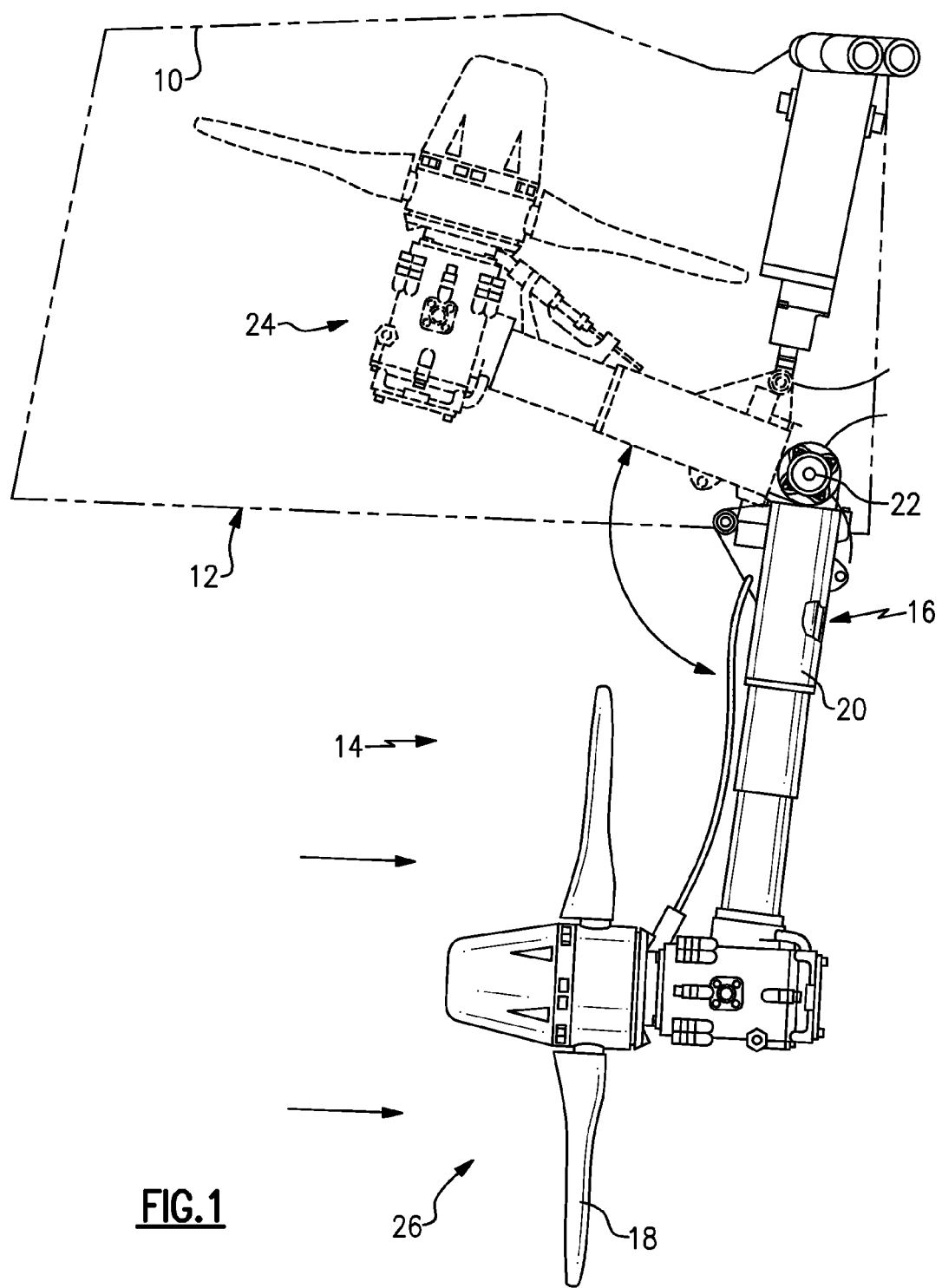
FIG. 1 is a schematic view of an example ram air turbine in stowed and deployed positions.

Referring to FIG. 1, an aircraft structure schematically shown at 10 includes an opening or hatch 12 through which a ram air turbine 14 moves from a stowed position 24 to a deployed position 26. In the stowed position 24, the ram air turbine 14 is disposed within the aircraft structure 10 and turbine blades 18 are fixed in a desired orientation to prevent contact with the surrounding structure. The desired orientation of the turbine blades 18 provide for movement of the ram air turbine 14 through the opening 12 of the aircraft structure 10.

The example ram air turbine 14 includes a generator housing 20 that is pivotally attached to rotate around a pivot 22. The generator housing 20 supports a generator 16 that is driven by the turbine blades 18. The example generator 16 is disposed within the generator housing 20. The turbine blades 18 rotate responsive to the air stream along the outside of the aircraft structure 10 to drive the generator 16. As appreciated, the example ram air turbine assembly 14 is disclosed with a generator 16 although the ram air turbine 14 could also drive a hydraulic pump or any other device.

Figure 2:
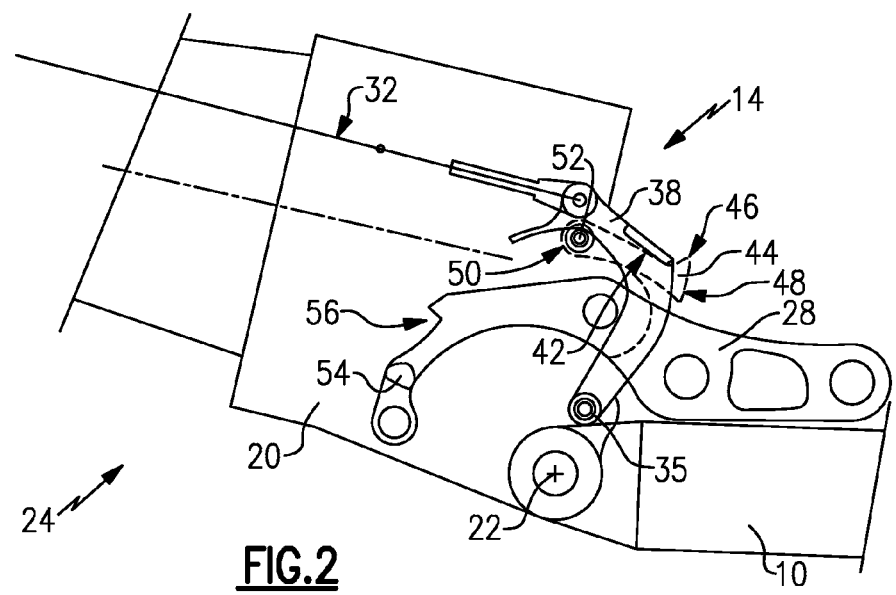
FIG. 2 is a partial schematic view of an example stow abort mechanism in a stowed position.
Figure 3:
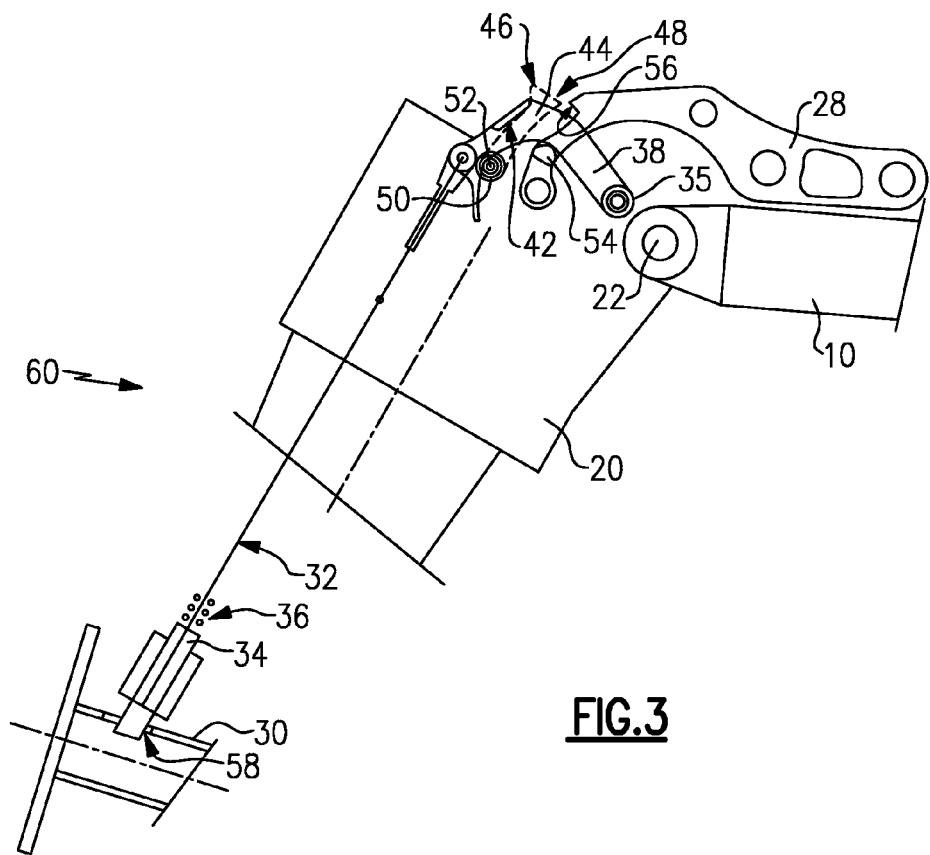
FIG. 3 is a partial schematic view of the example stow abort mechanism in a partially deployed position.

Referring to FIG. 2, a portion of the ram air turbine 14 is shown in a stowed position 24. The ram air turbine 14 includes the generator housing 20 that is supported on the aircraft structure 10 and rotates about the pivot 22 to provide for movement between the stowed position 24 and the deployed position 26. A fixed bracket 28 is attached to the aircraft structure 10. The release lever 38 is pivotally attached to rotate about a pivot 35 that is attached to the generator housing 20. The release lever 38 is attached to a cable 32 that extends from the release lever 38 to a release pin 34 (FIG. 3). The rotational position of the release lever 38 about the pivot 35 is determined by the location of the release pin 34 that is transmitted through the cable 32. The rotational position of the release lever 38 moves with the release pin 34 until the release lever 38 engages the stop 54 during deployment of the ram air turbine 14.

A pawl 44 is attached to the generator housing 20 and rotates about pivot 52 and is biased by a biasing member 50 toward contact with a cam surface 42. The example cam surface 42 is disposed on the release lever 38. The pawl 44 includes a cam portion 46 and a locking surface 48. The fixed bracket 28 includes a notch 56 that the locking surface 48 of the pawl 44 will engage when the pawl 44 is in a stop position. The example fixed bracket 28 is fixed to the aircraft structure 10 and also supports the stop 54. The example fixed bracket 28 can also be mounted to any structure that remains stationary relative to movement of the generator housing 20.

Referring to FIG. 3, the ram air turbine 14 is shown in a partially deployed position 60. In this position, the generator housing 20 is moving toward the fully deployed position 26 and the release pin 34 is still received within the opening 58 of the drive shaft 30. The generator housing 20 has not reached a position where the release pin 34 is pulled free of the drive shaft 30 by the cable 32.

Movement of the ram air turbine 14 to the deployed position 26 includes movement of the generator housing 20 about the pivot 22. This movement about the pivot 22 causes a corresponding movement of the release lever 38 and pawl 44. Each of the release lever 38 and pawl 44 moves with the generator housing 20 as it moves from the FIG. 2 position to the FIG. 3 position. The cable 32 that is attached to the release lever 38 is also attached to the release pin 34. With the release pin 34 within the opening 58 the drive shaft 30 is not allowed to turn and thereby maintains the turbine blades 18 in a desired position that provides for clearance through the aircraft hatch 12. A biasing member 36 biases the release pin 34 towards engagement with the drive shaft 30 such that it is received within the opening 58 when in proper alignment.

During movement of the ram air turbine 14 to the deployed position 26 the release lever 38 will rotate about the pivot 35 until it contacts the stop 54 as is shown in FIG. 3. Once the release lever 38 contacts the stop 54 it no longer rotates. The stop position of the release lever 38 thereby will cause the cable 32 to pull on the release pin 34 until it reaches the deployed position 26 as is best shown in FIG. 5. The cable 32 is of such a length that it will pull the release pin from the opening 58 once the generator housing 20 is moved past a partially deployed position as indicated at 60 in FIG. 3, toward the fully deployed position 26 (Shown in FIGS. 1 and 5). Once the ram air turbine 14 is moved to partially deployed position 60, the cable 32 begins to pull the release pin 34 from the opening 58 thereby releasing the drive shaft 30.

Referring to FIG. 4, the ram air turbine 14 is shown in another partially deployed position indicated at 62 moving toward the deployed position 26 (Shown in FIGS. 1 and 5). In the partially deployed position 62, the release lever 38 has contacted the stop 54 and therefore pulls on the cable 32 to pull the release pin 34 just far enough to clear the opening 58 in the drive shaft 30. Once the release pin 34 is clear of the drive shaft 30, the drive shaft 30 is free to rotate and the ram air turbine 14 can operate as intended to generate power.

Once the release pin 34 comes disengaged from the opening 58 of the drive shaft 30, the release lever 38 continues to contact stop 54 until the fully deployed position as shown in FIG. 5 is reached. In the position shown in FIG. 5, movement of the pawl 44 along the cam surface 42 causes the pawl 44 to move to a position that makes it engageable with the notch 56 of the fixed bracket 28 during a subsequent stow operation.

The pawl 44 is biased towards contact with the cam surface 42 by the biasing member 50. Once the release pin 34 is disengaged from the opening 58 and is riding on an outer surface of the drive shaft 30 as shown in FIG. 4, movement toward the stowed position 24 (Best shown in FIG. 1) causes cable 32 to push the release lever 38 away from the stop 54. This occurs while the release pin 34 is prevented from moving into the opening 58 because it is no longer aligned.

Figure 6:
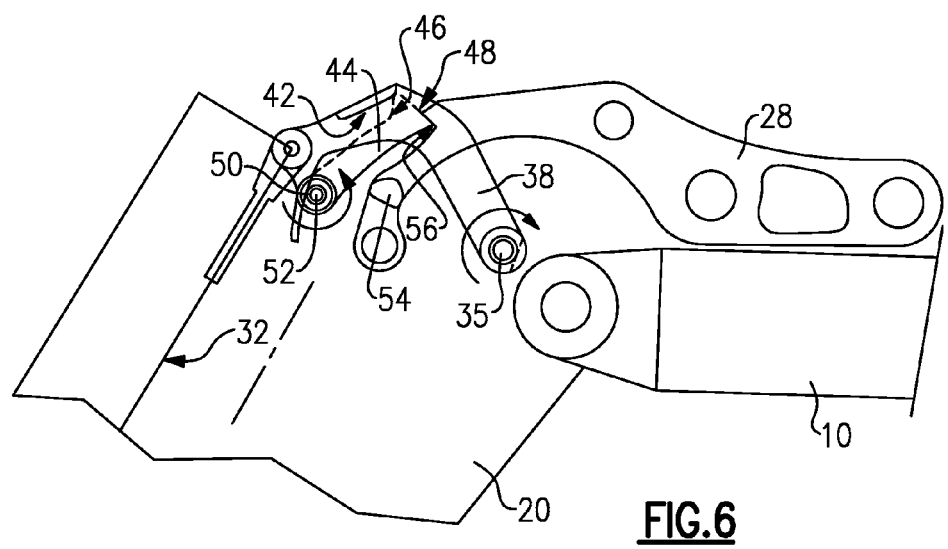
FIG. 6 is a schematic representation of the example stow abort mechanism in a stow prevention position.
Figure 7:
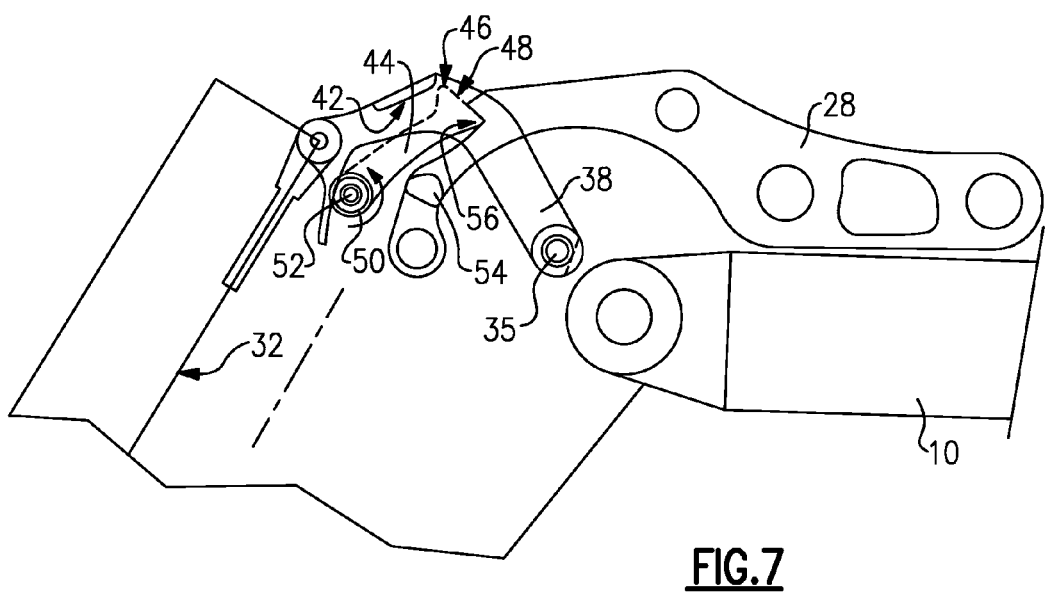
FIG. 7 is a schematic representation of the stow abort mechanism engaged to prevent movement of the ram air turbine to the stowed position.

Rotation of the release lever 38 away from the stop 54 is no longer prohibited by the position of the release pin 34 within the opening 58. This movement away from the stop 54 causes the cam portion 46 of the pawl 44 to engage the cam surface 42 of the release lever 38. The cam surface 42 of the release lever 38 drives the pawl 44 into a position that will cause locking against the locking notch 56 once movement toward the stowed position as is shown in FIG. 6 is reached. In the absence of friction between the locking 48 and the notch 56, the pawl 44 will engage more deeply into the notch 56 as shown in FIG. 7.

If the turbine blades 18 are misaligned while the ram air turbine 14 is being stowed, the release pin 34 remains on the outside of the drive shaft 30. Accordingly, the release pin 34, cable 32, release lever 38 and the pawl 44 all maintain position relative to the generator housing 20 that prevent movement to the stowed position 24.

Referring to FIG. 6, once the release pin 34 is free of the opening 58, the release lever 38 moves away the stop 54, and the pawl 44 is moved to a position that will engage the locking notch 56. Accordingly, subsequent movement of the ram air turbine 14 towards its deployed position 26 while the release pin 34 is not received within the opening 58 of the drive shaft 30 will result in the pawl locking surface 48 engaging the lock notch 56 of the fixed bracket 28. This positive mechanical engagement between the locking surface 48 and the locking notch 56 prevents movement of the ram air turbine 14 to the stowed position 24.

Accordingly only until such time as the release pin 34 is engaged and received within the opening 58 to pull the release lever 38 downward against the stop 54 will the pawl 44 be released and moved to a position that will not engage the locking notch 56.

Therefore, the example ram air turbine 14 is prevented from moving to the stowed position 24 by the mechanical interaction between the release lever 38, the pawl 44 and the locking notch 56. If the turbine blades 18 are not properly aligned the pawl 44 will continually engage the locking notch 56 and prevent movement to the stowed position 24.

In a normal stow operation, once the release pin 34 reenters the opening 58 to lock the drive shaft 30, and thereby the blades 18 in a desired stowed orientation, the pawl 44 moves free of the locking notch 56. The ram air turbine 14 is then free to move to the complete stowed position 24 (FIG. 1). Once the release pin 34 is received within the opening 58, the release lever 38 and pawl 44 maintain the position shown in FIG. 3. In the position shown in FIG. 3, the pawl 44 clears the locking notch 56 and movement to the deployed position is allowed.

Although an example embodiment of claimed device has been disclosed, a worker of ordinary skill in this art would recognize that certain modifications would come within the scope of this disclosure. For that reason, the following claims should be studied to determine the true scope and content of this invention.

What is claimed is:

1. A ram air turbine assembly comprising:
   a release pin movable between an engaged position that prevents rotation of a drive shaft and a released position that allows rotation of the drive shaft;
   a release lever pivot movable responsive to a position of the release pin;
   a pawl rotatable about a pivot between a clearance position and a blocking position in response to a position of the release lever; and
   a lock engaged by the pawl when the pawl is in the blocking position to prevent movement of the ram air turbine assembly to a stowed position.

2. The ram air turbine assembly as recited in claim 1, including a link between the release pin and the release lever.

3. The ram air turbine assembly as recited in claim 1, wherein the release lever includes a cam surface and the pawl is biased against the cam surface such that movement of the release lever drives the pawl between the clearance position and the blocking positions.

4. The ram air turbine assembly as recited in claim 2, including a stop that restricts movement of the release lever such that the link moves the release pin to the released position, wherein the release lever moves away from the stop when the release pin is in the released position.

5. The ram air turbine assembly as recited in claim 4, wherein the pawl is driven to the blocking position once the release lever moves away from the stop.

6. The ram air turbine assembly as recited in claim 2, wherein the link comprise a flexible element.

7. The ram air turbine assembly as recited in claim 1, wherein the drive shaft includes an opening for receiving the release pin, and the release pin is biased toward the drive shaft.

8. The ram air turbine assembly as recited in claim 1, wherein the lock comprises a notch that receives the pawl and blocks movement toward the stowed position.

9. A stow prevention assembly for a ram air turbine comprising:
a release pin movable between an engaged position that fixes a position of a drive shaft and a released position;
a release lever movable responsive to a position of the release pin;
a pawl rotatable about a pivot between a clearance position and a blocking position responsive to movement of the release lever; and
a block engaged by the pawl when the pawl is in the blocking position such that the ram air turbine is prevented from moving to a stowed position.

10. The stow prevention assembly as recited in claim 9, wherein the release lever includes a cam surface that drives the pawl to the blocking position when the release lever moves responsive to the release pin being in the released position.

11. The stow prevention assembly as recited in claim 10, including a stop restricting movement of the release lever and causing movement of the release pin from the engaged position to the released position.

12. The stow prevention assembly as recited in claim 9, wherein the block comprises a surface of a fixed structure.

13. The stow prevention assembly as recited in claim 9, including a flexible link between the release pin and the release lever.

14. The stow prevention assembly as recited in claim 9, including a first biasing member biasing the release pin toward the engaged position.

15. The stow prevention assembly as recited in claim 9, wherein the release lever pivotally mounted to a fixed structure supporting the ram air turbine.

16. A ram air turbine assembly comprising:
a movable support structure attachable to a fixed structure;
a turbine mounted to the movable support structure, the turbine including at least one turbine blade and a drive shaft driven by the turbine blade responsive to an airstream proximate an aircraft structure;
a release pin movable between an engaged position that prevents rotation of the drive shaft and a released position; and
a pawl rotatable about a pivot between a clearance position and a blocking position responsive to movement of the release pin, wherein the pawl engages a fixed structure to prevent movement of the support structure to a stowed position when in the blocking position.

17. The ram air turbine assembly as recited in claim 16, including a release lever rotatable in response to linear movement of the release pin, the release lever including a cam surface.

18. The ram air turbine assembly as recited in claim 17, wherein the pawl is biased into contact with the cam surface that drives the pawl to the blocking position.

19. The ram air turbine assembly as recited in claim 1, wherein both the release lever and the pawl rotate about pivots disposed transverse to a direction of linear movement of the release pin.

20. The stow prevention assembly as recited in claim 9, wherein the release pin moves linearly between the engaged position and the released position and the release lever and the pawl rotate about pivots transverse to the linear movement of the release pin.

21. The ram air turbine as recited in claim 1, wherein the pawl comprises a lever rotatable about the second pivot.

* * * * *